Patented Oct. 8, 1940

2,216,865

UNITED STATES PATENT OFFICE 2,216,865

TREATMENT OF DRILLING FLUIDS

Truman B. Wayne, Houston, Tex.

No Drawing. Application September 18, 1937,
Serial No. 164,528

18 Claims. (Cl. 255—1)

This invention relates to mud-laden or drilling fluids and particularly to treatment of drilling fluids employed in rotary drilling. This application is a continuation of my application, Serial Number 71,179, filed March 27, 1936, as to common subject matter.

One of the objects of this invention is to provide an agent adapted for the treatment of mud-laden or drilling fluids, which agent has improved properties and characteristics adapting it for such use, and which is efficient in reducing the viscosity of the drilling fluid, while maintaining its desirable characteristics generally.

Another object is to provide a novel process of treating mud-laden or drilling fluids, which will produce a novel drilling fluid having improved characteristics and properties.

Further objects will appear from the detailed description in which will be disclosed a number of embodiments of this invention; it is understood, however, that these embodiments are simply illustrative.

In application, Serial Number 24,083 filed May 29, 1935, a number of suitable agents are described, among which are water soluble phosphoric acid compounds, including commercial phosphoric acid and the soluble salts of ortho-, meta-, and pyro-phosphoric acids and their salts; these phosphoric acid compounds being used either alone or in connection with lyophile agents and/or a buffer.

In application, Serial Number 71,179, additional agents are disclosed, including alkali metal salts of meta-phosphoric acid, particularly sodium hexametaphosphates, as well as esters of phosphoric acid.

The esters of meta-phosphoric acid (particularly when used with hydroxy compounds of the tannin type), and the esters of ortho-phosphoric acid have a degeling action on drilling fluids. This may be attributable to the fact that esters of ortho-phosphoric acid, such, for instance, as an ester prepared from pyrogallol and ortho-phosphoric acid, may be feebly acidic when first introduced into the mud, and the phosphate radical or even the carboxyl or phenyl radicals present in the composition or which become available through hydrolysis or ionization may react with the alkaline earth constituents present in the mud. This reaction is accomplished without substantial variation of the pH value of the mud, as the reagents themselves do not depend on the deflocculating action of free alkali and thus obviate the swelling and hydration of the clay particles which almost invariably follows the use of alkaline treating agents, or those which liberate alkaline sodium compounds in their reactions with the alkaline earth constituents of the mud. The use of a strongly acid compound, unless used in an amount sufficient to denature most of the colloids of the mud, would cause flocculation and thickening.

The corresponding esters of ortho-phosphoric acid also have the effect of a feebly acidic, slowly ionizing complex compound of high molecular weight whose alkaline earth salts are colloidal and whose protective effect is not destroyed by the formation of such salts. If, for instance, a reaction occurs with free calcium hydroxide or other alkaline lime compounds in the mud, the reaction products liberated are relatively inert and do not affect the hydration of the clay particles. When used in connection with alkaline compounds such as sodium hydroxide, sodium carbonate, soluble silicates, trisodium ortho-phosphate, etc., the complex, feebly acidic esters of meta- and ortho-phosphoric acid retard ionization of such strong alkalies.

In the case of the esters of either ortho- or metaphosphoric and hydroxy carboxylic acid such as gallic acid and the like, it is possible that the alkaline earth constituents in the mud react with the carboxyl group or its soluble sodium, ammonium, or hydroxyamine salts.

With the pH value of the mud maintained substantially constant, notwithstanding the reactions which may be going on to neutralize the effect of the alkaline earth constituents taken up by them, the effect of the usual organic protectives present, naturally or artificially, in the mud is unmitigated.

The esters of metaphosphoric acid are particularly well suited for use in accordance with the present invention. These esters may be prepared by first isolating the free metaphosphoric acid in any suitable manner and then esterifying the anhydrous or nearly anhydrous free acid with an organic hydroxy body by any of the well known procedures used in the preparation of organic esters. The acid and organic hydroxy body may, for instance, be esterified by heating them for several hours below the decomposition point of the hydroxy bodies employed and a suitable catalyst may be employed to hasten the reaction. If desired, dry hydrogen chloride gas may be passed through the reaction mixture to accelerate the esterification and carry it more nearly to completion. Suitable inert solvents may also be employed for expediting the reaction and in fact any of the expedients occurring to those skilled in the art of organic reactions and synthesis may be employed.

Esters of metaphosphoric acid with poly-hydroxy phenols which are amphoteric in nature, such as pyrogallol, resorcinol, phloroglucinol, hydroxyquinol, and catechol; esters, glucosides, and anhydrous salts of gallic, protocatechuic, digallic, ellagic, and similar poly-hydroxy aromatic acids having free hydroxyl groups, are particularly suitable for use in accordance with the present invention. Esters of metaphosphoric acid with fully soluble poly-hydric alcohols such as glycerol, glycol and arabitol are suitable but the esters of metaphosphoric acid with tannins and tannin-like bodies commend themselves as more desirable from a practical standpoint.

Analogous esters of ortho-phosphoric acid are likewise suitable. For example an ester prepared by heating molecular proportions of pyrogallol and ortho-phosphoric acid of approximately 100% strength at 150° C. for several hours in a closed vessel may be used with good results. While the ester just described was, in one case, only about 62% efficient as in an analogous ester of metaphosphoric acid, the difference in efficiency between the esters is not comparable with the difference in the efficiency between the salts of ortho and metaphosphoric acid, as is the case with sodium ortho-phosphate which was only about 11.5% as efficient as the corresponding amount of sodium hexametaphosphate.

While the mud treating agents of the present invention may be applied to the mud in a dry condition, it is ordinarily more convenient to apply them in a convenient solution which may be added to the mud at a suitable point in the circulatory system. For instance, the treating agent may be added to the mud in the usual ditch just beyond the point where mud from the well is discharged or at any other suitable point before the mud reaches the suction pumps which return the stream to the bore hole. Frequently, however, it is advantageous to admit the treating agent directly into the pump suction as very efficient mixing is accomplished in this manner.

As a specific example illustrating the use of the treating compounds in accordance with this invention, a mud from the Fittstown area of Oklahoma, which had been previously untreated, was treated with two parts per thousand of a 10% isopropanol solution of an ester prepared from molecular proportions of phosphorus pentoxide and sodium tannate. The initial viscosity of 51.5 centipoises was thereby reduced to 24.0 centipoises.

The mud last mentioned is illustrative of one in which satisfactory results have not been obtainable with the usual alkaline caustic soda and tannin mixtures or mixtures of these with other customary materials.

As a further example illustrating the effect of the compounds of the present invention upon a ten pound mud prepared from corings derived from the Yegua shale formation of the Texas Gulf Coast area, such a mud was treated with an ester prepared from three molecules of anhydrous metaphosphoric acid and one molecule of the anhydrous sodium salt of gallic acid. This agent also used as a 10% alcoholic solution in the proportion of two parts for each thousand parts of mud. The initial viscosity of 57 centipoises was reduced to 26 centipoises by this treatment.

Examples have been given in the preceding examples of esters of the mono-basic acid (metaphosphoric acid) and a poly-basic phosphoric acid such as ortho phosphoric acid. The esters of poly-phosphoric acids such as pyro-phosphoric acids, $H_4P_2O_7$, and tetra-phosphoric acid, $H_6P_4O_{13}$, are likewise very suitable degelling agents for the reason that esters can be readily prepared from these by exactly the same procedure used in preparing such esters from metaphosphoric and ortho-phosphoric acids, respectively.

These poly-phosphoric acids, namely, pyrophosphoric acid and tetra-phosphoric acid, can very conveniently be made by the controlled hydration of phosphorous pentoxide, $P_2O_5$. Below are given examples of the preparation of various phosphoric acids by controlled hydration of $P_2O_5$.

$P_2O_5 + H_2O = 2HPO_3$     Metaphosphoric acid
$P_2O_5 + 2H_2O = H_4P_2O_7$     Pyrophosphoric acid
$2P_2O_5 + 3H_2O = H_6P_4O_{13}$     Tetraphosphoric acid
$P_2O_5 + 3H_2O = 2H_3PO_4$     Orthophosphoric acid These various esters of the mono-basic and poly-basic phosphoric acids are all very suitable degelling agents and may be used alone as such, but obviously may be used in combination or in admixture with treating agents of the character described by the Lawton et al. Patent No. 1,999,766, or with various salts of phosphoric acid such as are described in my copending applications, Serial No. 24,083 filed May 29, 1935 and Serial No. 71,179 filed March 27, 1936, and any other treating agents which may be employed for the degelling of drilling fluids.

These phosphoric acid esters are powerful protective colloids and, at the same time, possess the property of controlling the ionization of alkalies and acids which may be present in the drilling fluid either naturally or through the addition of alkaline or acidic degelling agents. If desired, additional protective colloids, such as tannins and other organic materials, may be used in conjunction with these phosphoric acid esters.

Of course, these esters of phosphoric acid with tannin will usually not require any added tannin or tannic acid, gallic acid, or anything of that nature because they are, in themselves, self-contained bodies, embodying a phosphate radical and a tannin or tannin-like body. However, in preparing these products, the reactions never go completely to the esters, and if no attempt is made to purify the crude ester and the mass is simply neutralized and used as it is, the crude ester treating agent will contain, in addition to the ester, some tannins and some sodium tannate. As far as buffers are concerned, these tannin esters themselves are very effective buffers. The compositions as ordinarily prepared will, therefore, contain tannins as well as buffers.

While in the foregoing specific examples the effect of the treating agents of the present invention used alone has been illustrated, it will be understood that other mud treating agents heretofore employed and having a particular effect upon the mud may be employed together with the compounds of the present invention. For instance, alkaline sodium tannates, sodium orthophosphates, sodium silicates, etc., which have a buffering action, may be used together with the compounds of the present invention. In most instances, however, due to the relatively small amounts of the treating agents of the present invention required to produce efficient results, it is desirable to use the agents of the present invention unsupplemented by agents such as those just mentioned.

While in the foregoing disclosure reference has been made to various theories of action of the compounds contemplated by this invention and the reactions taking place in the mud pursuant to treatment have been referred to, it is to be understood that while the ultimate effect of the compounds has been proved, the specific actions and reactions herein suggested are speculative to the extent that they are not ascertained with certainty, and hence the invention is not to be interpreted as being limited by any theoretical consideration or action as herein suggested for the purpose of facilitating an understanding of the disclosure.

From the foregoing description it is apparent that the present invention accomplishes its object, and provides a treatment for drilling muds in which smaller quantities of the agent are necessary to produce the desired effect than of those agents heretofore employed for this purpose, and that the effect of the agents of the present invention is a prolonged effect as distinguished from the more or less temporary effect of the agents heretofore used.

While in the foregoing disclosure of the present invention reference has been made to various specific examples of the mud treating agents in accordance with the present invention, it is not to be understood that the present invention is limited to those particular agents and combinations of agents herein specifically described, but on the contrary the features of the present invention may be applied generally and various modifications may be made in the formulae without departing from the spirit of this invention. It is to be distinctly understood, therefore, that such modifications and the use of such individual features and subcombinations of features as present themselves to those skilled in the art without departing from the spirit of this invention are, although not specifically described herein, contemplated by and within the scope of the appended claims.

Having thus described the invention, what is claimed is:

1. A mud-laden or drilling fluid for wells containing a small percentage of an ester of phosphoric acid.
2. A mud-laden or drilling fluid for wells containing a small percentage of an ester of phosphoric acid and a buffer.
3. A mud-laden or drilling fluid for wells containing a small percentage of an ester of orthophosphoric acid.
4. A mud-laden or drilling fluid for wells containing a small percentage of an ester of metaphosphoric acid.
5. A process of drilling a well by the employment of a mud-laden or drilling fluid, characterized by the addition to the fluid of an ester of phosphoric acid.
6. A process of drilling a well by the employment of a mud-laden or drilling fluid, characterized by the addition to the fluid of an ester of phosphoric acid and a buffer.
7. A process of drilling a well by the employment of a mud-laden or drilling fluid, characterized by the addition to the fluid of an ester of orthophosphoric acid.
8. A process of drilling a well by the employment of a mud-laden or drilling fluid, characterized by the addition to the fluid of an ester of metaphosphoric acid.
9. A mud-laden well-drilling fluid degeling agent, comprising, an ester of phosphoric acid.
10. A mud-laden well-drilling fluid degeling agent, comprising, an ester of orthophosphoric acid.
11. A mud-laden well-drilling fluid degeling agent, comprising, an ester of metaphosphoric acid.
12. A mud-laden well-drilling fluid degeling agent, comprising an ester of a polyphosphoric acid compound.
13. A mud-laden well-drilling fluid degeling agent, comprising an ester of a polybasic polyphosphoric acid compound.
14. A mud-laden well-drilling fluid degeling agent, comprising, an ester prepared by the reaction of pyrogallol and orthophosphoric acid.
15. A mud-laden well-drilling fluid degeling agent, comprising an ester prepared by the reaction of sodium gallate and metaphosphoric acid.
16. A mud-laden well-drilling fluid degeling agent, comprising, a reaction product of sodium tannate and phosphorous pentoxide.
17. A mud-laden well-drilling fluid degeling agent, comprising, an ester of phosphoric acid and a buffer.
18. A mud-laden well-drilling fluid degeling agent, comprising, an ester of phosphoric acid and a lyophile colloid.

TRUMAN B. WAYNE.